United States Patent [19]

Fennell et al.

[11] Patent Number: 4,526,616
[45] Date of Patent: Jul. 2, 1985

[54] LOAD-BEARING THERMAL INSULATOR

[75] Inventors: Thomas G. Fennell, Coventry; Ronald Fisher, Rugby, both of England

[73] Assignee: Dunlop Limited, London, England

[21] Appl. No.: 513,090

[22] Filed: Jul. 12, 1983

[30] Foreign Application Priority Data

Jul. 27, 1982 [GB] United Kingdom ............... 82 21692

[51] Int. Cl.$^3$ ............................................. C07C 29/00
[52] U.S. Cl. ........................................ 75/234; 75/231; 419/19; 419/39; 419/60; 428/324; 428/363
[58] Field of Search ................... 75/233, 231, 234; 419/10, 19, 39, 60; 428/567, 324, 363

[56] References Cited

U.S. PATENT DOCUMENTS

| | | | |
|---|---|---|---|
| 3,817,719 | 6/1974 | Schilke et al. | 75/234 |
| 4,274,875 | 6/1981 | Cadle et al. | 419/10 |
| 4,383,856 | 5/1983 | Sata et al. | 419/10 |

Primary Examiner—Leland A. Sebastian
Attorney, Agent, or Firm—Stevens, Davis, Miller & Mosher

[57] ABSTRACT

A load-bearing thermal insulator, for example a brake piston thrust transmission element, which comprises platelets or flakes of thermally insulating material dispersed in a metal matrix and oriented normal to the direction of heat flow so as to impede the flow of heat through the matrix in one direction.

8 Claims, 3 Drawing Figures

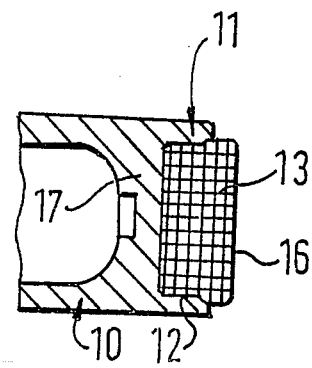
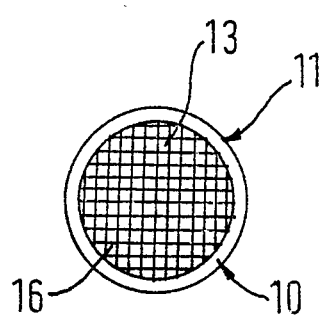
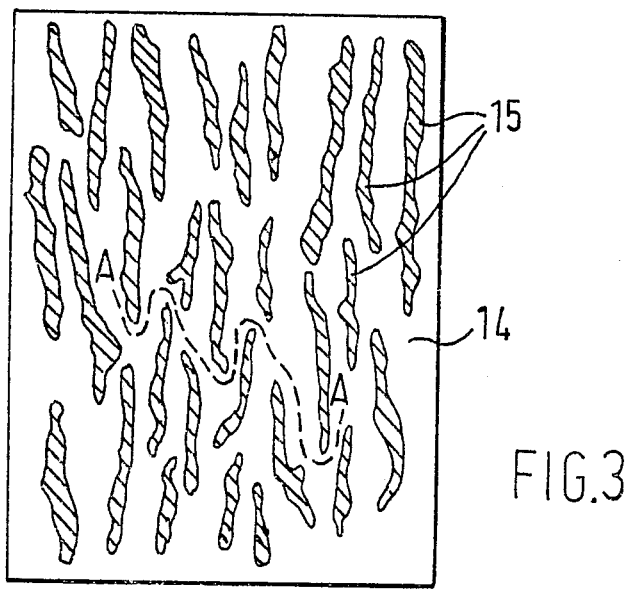

LOAD-BEARING THERMAL INSULATOR

This invention relates to an improved load-bearing thermal insulator.

Currently available materials which are good thermal insulators do not have good load-bearing capacity. Polymeric materials are deformable and degrade when heated, while ceramic materials are brittle and not normally suitable for final machining to close tolerances as required for certain engineering applications.

One example of the need for a load-bearing thermal insulator is in a multi-disc brake system where it is desired that load-bearing elements provided to transmit the thrust of hydraulic pistons to the brake discs should also serve to protect the pistons and their hydraulic operating systems from the high temperatures generated by the friction surfaces. Thrust elements formerly used for this purpose have been made from asbestos-fibre-reinforced phenolic resins but these tend to degrade at temperatures in excess of 400° C. which thus adversely affect their load-bearing capacity.

An alternative which has been proposed for these thrust elements is to make them from ceramic material. This is strong and capable of withstanding high temperatures but has the disadvantages of being expensive and brittle and the machining to shape and final close-tolerance dimensions of ceramic materials presents great problems if it is feasible at all.

From the load-bearing point of view the ideal material for these thrust elements would be metal which is relatively cheap and easily formed and/or machined, but the high thermal conductivity of a metal thrust element is disadvantageous in that it readily conducts heat to the hydraulic system, causing boiling of the fluid with loss of brake efficiency, and possible damage to components.

The primary object of the present invention is to provide a material which has the advantages of metal in terms of load-bearing capacity, low cost and ease of forming and machining but which will nevertheless provide an effective thermal barrier.

In accordance with the present invention there is provided a load-bearing thermal insulator comprising platelets or flakes of a thermally insulating material dispersed in a metal matric, a majority of the platelets or flakes having their major axes oriented to impede the flow of heat through the matrix material in one direction.

Heat flow in a component occurs from a hot zone to a cold zone and unless they are diverted the lines of flow will take the shortest route. In the material of the invention the platelets or flakes are oriented so as to interrupt and lengthen the flow paths through the matrix by which heat can flow. Thus the platelets or flakes are oriented so that a majority of them lie approximately normal to the direction of heat flow.

In a preferred embodiment of the invention the platelets or flakes are of ceramic material distributed in the matrix so that the greater-area surfaces of at least most of them are generally parallel. In a thrust transmission element for a braking system, the greater-area surfaces of at least most of the platelets or flakes will be generally parallel with the end surfaces of the element which are intended to engage the brake discs and the hydraulic mechanism respectively, or making low angles with the said end surfaces.

A preferred method of making a load-bearing thermal insulator element in accordance with the invention comprises mixing flakes or platelets of a ceramic material with metal powder and cold-pressing the mixture so that in the resultant body the greater-area surfaces of at least most of the flakes or platelets are similarly oriented transverse to the direction of application of the pressing force. The pressed body is then sintered, after which it may if necessary be machined to a final shape.

One advantage of the cold-pressing and sintering method is that it provides a degree of porosity in the finished element which, provided that the voids are not so large as to decrease strength, contributes to the thermal insulation properties. A preferred range of porosity would be 5% to 20% by volume.

A preferred matrix material is austenitic stainless-steel which itself has a relatively low thermal conductivity. A preferred ceramic material is mica-flake.

In the accompanying drawings,

FIG. 1 is a diagrammatic axial cross-sectional view showing part of a brake piston and thrust element assembly;

FIG. 2 is an end view of the assembly of FIG. 1 as viewed from the right-hand side of FIG. 1, and FIG. 3 is a diagrammatic cross-section, taken in the same plane as FIG. 1, showing a greatly enlarged portion of the thrust element.

The brake piston 10 shown in FIGS. 1 and 2 is of conventional shape for slidably fitting into a hydraulic brake-operating cylinder (not shown) with the leading end 11 projecting from the cylinder to engage the end stator disc of a stack of interleaved carbon stator and rotor disc in a multi-disc aircraft brake.

The leading end 11 of the piston 10 is recessed to provide a socket 12 in which a thermally insulating load-bearing element 13 is secured. The element 13 may be a press fit in the socket 12 or may alternatively or additionally be secured in the socket 12 by an adhesive, or additional mechanical means such as a rivet may be used to retain the element 13 in the socket.

The element 13 comprises sintered metal matrix 14 in which flakes 15 of mica are embedded. The process of manufacture of the element 13 is controlled to ensure that the majority of the flakes of mica are aligned so that their planes extend parallel or at low angles to the plane of the end face 16 of the element 13. FIG. 3 shows diagrammatically the appearance in cross-section of a typical distribution of the mica flakes 15 in the element 13, and it will be noted that the low-conductivity mica flakes obstruct the flow of heat in the axial direction of the element 13 and thus effectively lengthen the paths along which heat needs to flow through the metal matrix 14 in order to transfer heat axially through the element 13 from the leading end face 16 to the body 17 of the piston and thence to hydraulic fluid at the rear of the piston. A typical path for heat flow is indicated by the dotted line A—A, although it will be appreciated that in practice the routes through which heat may flow will be three-dimensional around the flakes 15. The resulting long heat flow paths in the material of the element 13 effectively reduce its overall thermal conductivity in the axial direction and thus provide it with insulating properties whilst retaining the strength and easy forming and machining characteristics of the sintered metal matrix.

Typical mica flakes which have been found suitable for the manufacture of the element 13 constitute irregular platelets having dimensions in their greater-area surface planes within the range 0.2 to 0.5 millimeters and average thicknesses within the range 0.01 to 0.04 millimeters.

In one preferred embodiment of the present invention, 20% by weight of mica-flake (a range of 10% to 30% is suitable) was mixed with 80% by weight of austenitic stainless-steel powder (a corresponding range of 70% to 90% is suitable). The cold mixture was first subjected in a mould to a pressure within the range 300 to 600 Mega Newtons per square meter to form the shape of the element 13 and the resulting body was sintered in vacuum at approximately 1,100 degrees Celsius (a temperature within the range 1000° C. to 1200° C. is suitable).

Samples of this material tested for thermal conductivity gave values of 1.75 Watts per meter degree Celsius perpendicular to the pressing direction and 0.67 Watts per meter degree Celsius in the pressing direction. Corresponding values for a standard phenolic/asbestos insulator were 1.2 in both directions.

The strength of the element 13 of this example in the axial direction measured at a temperature of 500 degrees Celsius was 350 Mega Newtons per square meter.

In an alternative example, 20% of mica flakes (as above) was mixed with 80% powdered titanium alloy (containing 5% aluminium and 2½% tin) and cold-pressed at a pressure of 450 Mega Newtons per square meter to form the shape of the element 13. The resulting body was then sintered in vacuum at 1100 degrees Celsius (similar ranges of proportions and temperatures to those given in the previous example are suitable).

Samples of this material tested for thermal conductivity gave values of 6.3 Watts per meter degree Celsius perpendicular to the cold-pressing direction and 2.6 Watts per meter degree Celsius in the pressing direction.

The strength of the element 13 of this example in the axial direction was 147 Mega Newtons per square meter.

The above examples demonstrate that by the use of the invention a predominantly metallic load-bearing element, having the inherent qualities of high strength and easy machining, is provided with a relatively low thermal conductivity in a desired direction, enabling it to be used for example as a brake piston thermal insulator. This type of insulator has been found to be particularly suitable for use with carbon brake disc packs.

Other possible uses for thermal insulators in accordance with the invention include pistons in internal combustion engines and insulators in gas turbine engines.

We claim:

1. A load-bearing material insulator comprising platelets or flakes of mica dispersed in a metal matrix, wherein a majority of the platelets or flakes are so oriented that their major axes lie approximately normal to the direction of heat flow so as impede the flow of heat through the matrix material; the mica platelets or flakes being 10 to 30 percent by weight.

2. An insulator in accordance with claim 1 wherein the platelets or flakes are distributed in the matrix so that the greater-area surfaces of a majority of the particles are substantially parallel or at low angles to one another.

3. An insulator in accordance with claim 2 constituting a thrust-transmission element for a braking system, the greater-area surfaces of at least most of the platelets or flakes being generally parallel to or making low angles with an axial end surface of the element.

4. An insulator in accordance with claim 2 wherein the platelets have dimensions in their greater-area surface planes in the range 0.2 to 0.5 millimeters and average thicknesses in the range 0.01 to 0.04 millimeters.

5. An insulator in accordance with claim 1 wherein the matrix material is sintered austenitic stainless steel.

6. An insulator in accordance with claim 1 wherein the matrix material is sintered titanium alloy.

7. A method of making a load bearing thermal insulator having platelets or flakes of a thermally insulating material dispersed in a metal matrix with a majority of the platelets or flakes having their major axes lying approximately normal to the direction of heat flow through insulator, said method comprising mixing 10 to 30 percent by weight of flakes or platelets of mica with metal powder and cold-pressing the mixture so that in the resultant body the greater-area surfaces of at least most of the flakes or platelets are oriented substantially transversely to the direction of application of the pressing force, and then sintering the pressed body.

8. A method in accordance with claim 7 wherein the mixture is cold-pressed in a mould at a pressure in the range 300 to 600 Mega Newtons per square meter and the resulting body is sintered in vacuum at a temperature in the range 1000 to 1200 degrees Celsius.

* * * * *